US011184342B2

(12) United States Patent
Hodge et al.

(10) Patent No.: US 11,184,342 B2
(45) Date of Patent: Nov. 23, 2021

(54) MULTIFUNCTION WIRELESS DEVICE

(71) Applicant: **Global Tel*Link Corporation**, Reston, VA (US)

(72) Inventors: Stephen Hodge, Aubrey, TX (US); Garth Johnson, Indianapolis, IN (US); Christopher McNitt, Fort Worth, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 16/993,391

(22) Filed: Aug. 14, 2020

(65) Prior Publication Data

US 2021/0029102 A1 Jan. 28, 2021

Related U.S. Application Data

(63) Continuation of application No. 16/434,783, filed on Jun. 7, 2019, now Pat. No. 10,757,249, which is a
(Continued)

(51) Int. Cl.
*H04L 29/06* (2006.01)
*H04W 4/24* (2018.01)
(Continued)

(52) U.S. Cl.
CPC ............ *H04L 63/08* (2013.01); *G06F 21/305* (2013.01); *G06F 21/32* (2013.01); *G06F 21/88* (2013.01);
(Continued)

(58) Field of Classification Search
CPC ..... H04L 63/08; H04L 63/10; H04L 63/0861; H04L 65/1006; H04L 2463/082;
(Continued)

(56) References Cited

U.S. PATENT DOCUMENTS 4,495,386 A 1/1985 Brown et al.
5,896,556 A 4/1999 Moreland et al.
(Continued)

OTHER PUBLICATIONS

"Criminal Calls: A Review of the Bureau of Prisons' Management of Inmate Telephone Privileges," U.S. Department of Justice, Office of the Inspector General, Aug. 1999.
European Search Report and Opinion directed to European Patent Application No. 14769931.8, dated Oct. 26, 2016; 10 pages.
International Search Report and Written Opinion of the International Searching Authority, directed to related International Patent Application No. PCT/US14/31339, dated Nov. 6, 2014; 19 pages.
(Continued)

*Primary Examiner* — Nizar N Sivji
(74) *Attorney, Agent, or Firm* — Sterne, Kessler, Goldstein & Fox P.L.L.C.

(57) ABSTRACT

A communication device and system are disclosed for providing communication and data services to residents of a controlled facility. The device can be restricted to communicating only using an internet protocol so as to restrict the device communication to an internal intranet. Wireless access points may be disposed throughout the environment to route calls and data between the device and a central processing center. By converting a protocol of the communications received from the device to a protocol used by the central processing center, minimal modifications to the central processing center are needed to support a wireless communication infrastructure. Many restrictions and safeguards may be implemented within the phone and system in order to prevent improper use.

15 Claims, 9 Drawing Sheets

Related U.S. Application Data continuation of application No. 15/889,941, filed on Feb. 6, 2018, now Pat. No. 10,341,484, which is a continuation of application No. 15/090,886, filed on Apr. 5, 2016, now Pat. No. 9,888,108, which is a continuation of application No. 13/946,637, filed on Jul. 19, 2013, now Pat. No. 9,307,386.

(60) Provisional application No. 61/804,479, filed on Mar. 22, 2013.

(51) Int. Cl.

| | |
|---|---|
| *H04W 4/029* | (2018.01) |
| *H04M 3/22* | (2006.01) |
| *H04M 15/00* | (2006.01) |
| *H04M 17/02* | (2006.01) |
| *H04W 12/06* | (2021.01) |
| *H04W 12/08* | (2021.01) |
| *H04M 1/72457* | (2021.01) |
| *H04M 1/72463* | (2021.01) |
| *H04W 12/065* | (2021.01) |
| *H04W 12/082* | (2021.01) |
| *H04M 3/42* | (2006.01) |
| *H04M 3/436* | (2006.01) |
| *G06F 21/30* | (2013.01) |
| *G06F 21/32* | (2013.01) |
| *G06F 21/88* | (2013.01) |
| *H04W 4/12* | (2009.01) |
| *H04W 4/02* | (2018.01) |
| *H04W 84/12* | (2009.01) |

(52) U.S. Cl.
CPC .......... *H04L 63/0861* (2013.01); *H04L 63/10* (2013.01); *H04L 65/1006* (2013.01); *H04M 1/72457* (2021.01); *H04M 1/72463* (2021.01); *H04M 3/22* (2013.01); *H04M 3/2281* (2013.01); *H04M 3/42025* (2013.01); *H04M 3/42059* (2013.01); *H04M 3/4365* (2013.01); *H04M 15/09* (2013.01); *H04M 15/77* (2013.01); *H04M 15/854* (2013.01); *H04M 17/02* (2013.01); *H04W 4/02* (2013.01); *H04W 4/029* (2018.02); *H04W 4/12* (2013.01); *H04W 4/24* (2013.01); *H04W 12/06* (2013.01); *H04W 12/065* (2021.01); *H04W 12/08* (2013.01); *H04W 12/082* (2021.01); *H04L 2463/082* (2013.01); *H04M 2203/2033* (2013.01); *H04M 2203/6045* (2013.01); *H04W 84/12* (2013.01)

(58) Field of Classification Search
CPC ......... H04M 1/72577; H04M 1/72572; H04M 3/42059; H04M 3/2281; H04M 15/09; H04M 3/42025; H04M 3/22; H04M 2203/6045; H04M 2203/2033; H04M 17/02; H04M 15/854; H04M 3/4365; H04M 15/77; G06F 21/32; G06F 21/88; G06F 21/305; H04W 12/0802; H04W 12/06; H04W 12/08; H04W 4/02; H04W 4/029; H04W 84/12; H04W 4/12; H04W 4/24; H04W 12/0605
See application file for complete search history.

(56) References Cited

U.S. PATENT DOCUMENTS

| | | | |
|---|---|---|---|
| 6,058,173 A | 5/2000 | Penfield et al. | |
| 6,668,045 B1 | 12/2003 | Mow | |
| 6,965,590 B1 | 11/2005 | Schmidl et al. | |
| 7,085,359 B2 | 8/2006 | Crites et al. | |
| 7,106,843 B1 | 9/2006 | Gainsboro et al. | |
| 7,218,993 B2 | 5/2007 | Yasukawa et al. | |
| 7,254,708 B2 | 8/2007 | Silvester | |
| 7,280,816 B2 | 10/2007 | Fratti et al. | |
| 7,333,798 B2 | 2/2008 | Hodge | |
| 7,366,782 B2 | 4/2008 | Chong et al. | |
| 7,529,357 B1 | 5/2009 | Rae et al. | |
| 7,742,581 B2 | 6/2010 | Hodge et al. | |
| 7,804,941 B2 | 9/2010 | Keiser et al. | |
| 7,860,222 B1 | 12/2010 | Sidler et al. | |
| 7,899,167 B1 | 3/2011 | Rae | |
| 8,019,354 B2 | 9/2011 | Rae et al. | |
| 8,031,052 B2 | 10/2011 | Polozola | |
| 8,370,206 B2 | 2/2013 | Collins | |
| 8,428,559 B2 | 4/2013 | Silva | |
| 8,498,937 B1 | 7/2013 | Shipman, Jr. et al. | |
| 8,571,525 B2 | 10/2013 | Weinstein et al. | |
| 8,639,926 B2 | 1/2014 | Brown et al. | |
| 8,646,056 B2 | 2/2014 | Poplett | |
| 8,917,848 B2 | 12/2014 | Torgersrud et al. | |
| 9,094,500 B1 | 7/2015 | Edwards | |
| 9,124,763 B2 | 9/2015 | Humphries | |
| 9,262,604 B2 | 2/2016 | Kimbrell | |
| 9,282,188 B2 | 3/2016 | Hodge et al. | |
| 9,307,386 B2 | 4/2016 | Hodge et al. | |
| 9,614,954 B2 | 4/2017 | Hodge et al. | |
| 9,614,955 B2 | 4/2017 | Hodge et al. | |
| 9,661,128 B2 | 5/2017 | Hodge et al. | |
| 9,674,338 B2 | 6/2017 | Hodge et al. | |
| 9,866,680 B2 | 1/2018 | Hodge et al. | |
| 9,871,915 B2 | 1/2018 | Hodge et al. | |
| 9,888,108 B2 | 2/2018 | Hodge et al. | |
| 9,892,242 B1 | 2/2018 | Hodge | |
| 10,341,484 B2 | 7/2019 | Hodge et al. | |
| 10,757,249 B2 | 8/2020 | Hodge et al. | |
| 2002/0071537 A1 | 6/2002 | Gainsboro | |
| 2003/0036381 A1 | 2/2003 | Nagashima | |
| 2003/0086546 A1 | 5/2003 | Falcone et al. | |
| 2003/0126470 A1 | 7/2003 | Crites et al. | |
| 2003/0198325 A1 | 10/2003 | Bayne | |
| 2003/0224764 A1 | 12/2003 | Baker | |
| 2005/0265529 A1 | 12/2005 | Hogg, Jr. et al. | |
| 2006/0062355 A1 | 3/2006 | Leonard | |
| 2006/0176169 A1 | 8/2006 | Doolin et al. | |
| 2007/0041545 A1 | 2/2007 | Gainsboro | |
| 2007/0047694 A1 | 3/2007 | Bouchard et al. | |
| 2007/0057763 A1 | 3/2007 | Blattner et al. | |
| 2008/0057976 A1 | 3/2008 | Rae et al. | |
| 2008/0200156 A1 | 8/2008 | Hicks et al. | |
| 2009/0080629 A1 | 3/2009 | Rokosky et al. | |
| 2010/0062833 A1 | 3/2010 | Mattice et al. | |
| 2010/0189228 A1 | 7/2010 | Seyfetdinov | |
| 2010/0260173 A1 | 10/2010 | Johnson | |
| 2011/0158223 A1 | 6/2011 | Liu et al. | |
| 2011/0213618 A1 | 9/2011 | Hodge et al. | |
| 2012/0023592 A1* | 1/2012 | Wilson ................... | G16H 10/60 726/28 |
| 2012/0099714 A1 | 4/2012 | Hodge | |
| 2012/0252411 A1 | 10/2012 | Johnsgard et al. | |
| 2012/0262271 A1 | 10/2012 | Torgersrud et al. | |
| 2013/0179210 A1 | 7/2013 | Collins | |
| 2013/0179949 A1* | 7/2013 | Shapiro ................... | G06F 21/10 726/4 |
| 2013/0311364 A1 | 11/2013 | Shipman et al. | |
| 2013/0318594 A1 | 11/2013 | Hoy et al. | |
| 2014/0018097 A1 | 1/2014 | Goldstein | |
| 2014/0032691 A1 | 1/2014 | Barton et al. | |
| 2014/0044242 A1 | 2/2014 | Hodge et al. | |
| 2014/0089849 A1 | 3/2014 | Choi et al. | |
| 2014/0109174 A1 | 4/2014 | Barton et al. | |
| 2014/0157141 A1 | 6/2014 | Hussain | |
| 2014/0219432 A1 | 8/2014 | Bengston et al. | |
| 2014/0228005 A1* | 8/2014 | Huang ................ | H04M 3/5183 455/414.1 |
| 2014/0267547 A1 | 9/2014 | Torgersrud et al. | |
| 2014/0273929 A1 | 9/2014 | Torgersrud | |
| 2014/0282868 A1 | 9/2014 | Sheller et al. | |

(56) References Cited

U.S. PATENT DOCUMENTS

| | | |
|---|---|---|
| 2014/0287715 A1 | 9/2014 | Hodge et al. |
| 2015/0242629 A1 | 8/2015 | Lindo et al. |
| 2016/0055323 A1 | 2/2016 | Stuntebeck et al. |
| 2016/0066182 A1 | 3/2016 | Hodge et al. |
| 2016/0088021 A1 | 3/2016 | Venkata et al. |
| 2016/0219146 A1 | 7/2016 | Hodge et al. |
| 2016/0267257 A1 | 9/2016 | Wisgo |
| 2016/0330084 A1 | 11/2016 | Hunter et al. |
| 2016/0381212 A1 | 12/2016 | Hodge et al. |
| 2016/0381219 A1 | 12/2016 | Hodge et al. |
| 2016/0381556 A1 | 12/2016 | Hodge et al. |
| 2017/0061006 A1 | 3/2017 | Hildebrand et al. |
| 2017/0177892 A1 | 6/2017 | Tingstrom et al. |
| 2017/0208468 A1 | 7/2017 | Hodge et al. |
| 2018/0159972 A1 | 6/2018 | Hodge et al. |
| 2019/0289127 A1 | 9/2019 | Hodge et al. |

OTHER PUBLICATIONS

Knox, "The Problem of Gangs and Security Threat Groups (STG's) in American Prisons Today: Recent Research Findings From the 2004 Prison Gang Survey," National Gang Crime Research Center, 2005; 67 pages.

Rey, R.F., ed., "Engineering and Operations in the Bell System," 2nd Edition, AT&T Bell Laboratories: Murray Hill, NJ, 1983.

Rosenberg, et al., "SIP: Session Initial Protocol," Network Working Group, Standard Track, Jun. 2002; 269 pages.

U.S. Appl. No. 61/801,861, "Handheld Video Visitation," to Torgersrud, et al., filed Mar. 15, 2013.

Winterdyk et al., "Managing Prison Gangs," Journal of Criminal Justice, vol. 38, 2010; pp. 730-736.

U.S. Appl. No. 61/804,479, filed Mar. 22, 2013.

Notice of Allowance directed to U.S. Appl. No. 13/946,637, dated Feb. 2, 2016; 13 pages.

\* cited by examiner

MULTIFUNCTION WIRELESS DEVICE

CROSS REFERENCE TO RELATED APPLICATIONS

This application is a continuation of U.S. application Ser. No. 16/434,783, filed Jun. 7, 2019, which is a continuation of U.S. application Ser. No. 15/889,941, filed Feb. 6, 2018, now U.S. Pat. No. 10,341,484, issued Jul. 2, 2019, which is a continuation of U.S. application Ser. No. 15/090,886, filed Apr. 5, 2016, now U.S. Pat. No. 9,888,108, issued Feb. 6, 2018, which is a continuation of U.S. application Ser. No. 13/946,637, filed Jul. 19, 2013, now U.S. Pat. No. 9,307,386, issued Apr. 5, 2016, which claims the benefit of related U.S. Provisional Application No. 61/804,479, filed Mar. 22, 2013, which are incorporated by reference herein in their entirety.

BACKGROUND

Technical Field

The disclosure relates to a multifunction wireless device, and more specifically to a wireless communication device capable of communicating over a WiFi network in a controlled environment.

Related Art

Conventional communication systems for residents (hereinafter "inmates") of controlled environments typically include a centralized call center from which inmates can make telephone calls over hardwired landlines. Alternatively, there may be several hardwired telephones scattered throughout the facility from which the inmates can make calls.

In the conventional system, all telephone calls are routed through a central processing center, which may be located on-site or off-site. The processing center can conventionally act as a local switching center for connecting calls, or can perform security functions, such as caller authentication, call monitoring, etc.

The restriction to using hardwired standalone telephone devices hampers inmate communication and is relatively cumbersome in today's wireless world.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
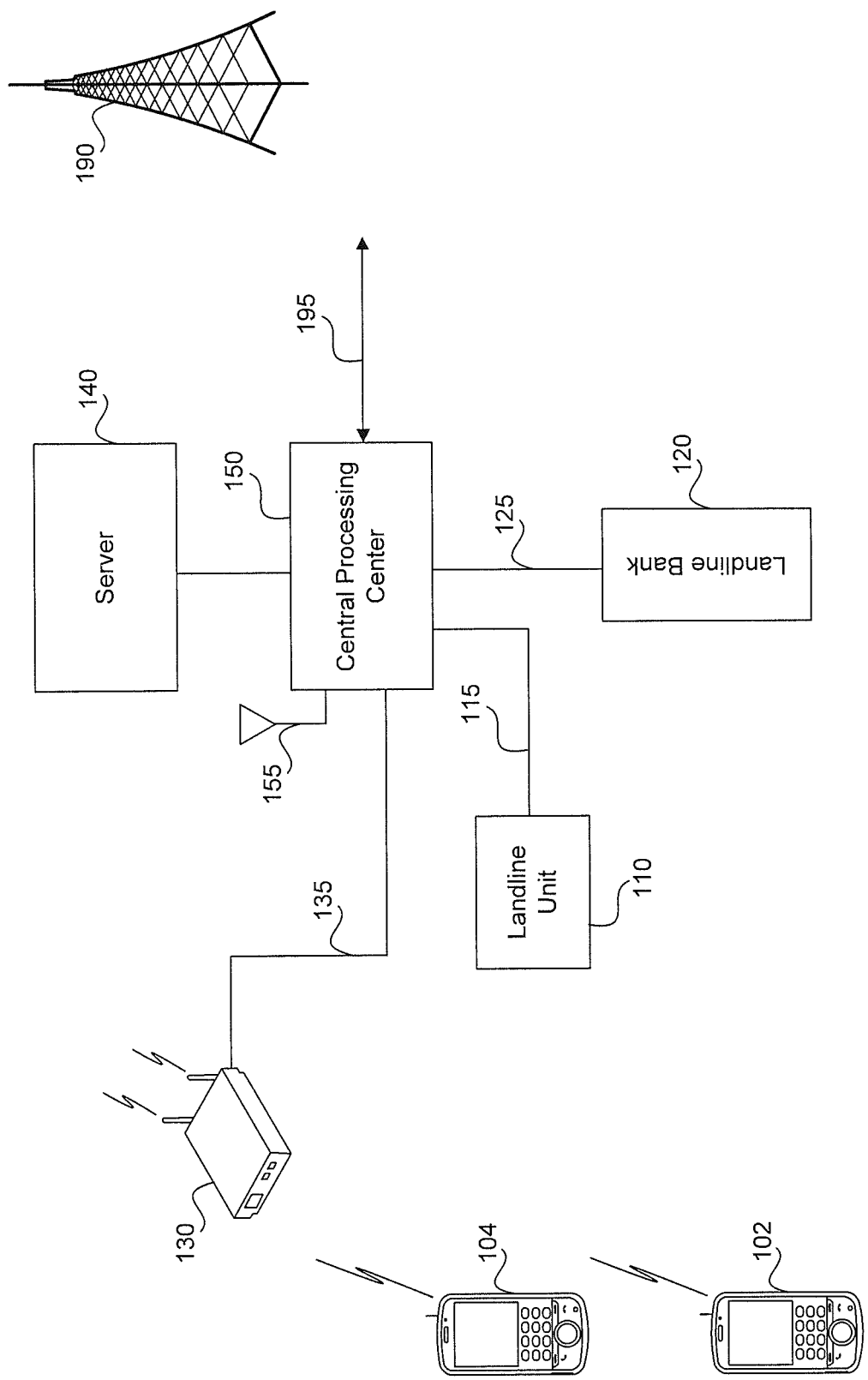
FIG. 1 illustrates an environment for routing and processing calls and data services to/from one or more multifunction wireless.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description below is made with respect to a prison facility or other controlled environment, the disclosed device and accompanying systems can be used in any environment having or capable of having a WiFi network.

Multi-Function Environment Overview

FIG. 1 illustrates an environment 100 for routing and processing calls and data services to/from one or more multifunction wireless devices (e.g., 102 and 104). The environment 100 includes a central processing center 150, a server 140, a wireless beacon/router 130, and one or more landline call stations 110/120.

In the environment 100, the central processing center 195 is configured to receive calls either from an inmate directed to a third party, or from a third party directed to the inmate. In either scenario, the central processing center 195 performs various processes to validate the connection between the inmate and the third party in order to either complete or restrict the call. Such processes may include authentication, payment confirmation, restriction detection, call blocking, and call monitoring, among others. Some of the more relevant processes performed by the central processing center 150 will be discussed in detail below. It should be understood that the central processing center 150 can be located on-site, or off-site, and can even be realized as a virtual cloud-based system.

In performing its various processes, the central processing center 150 may access one or more databases stored in a server 140. The server 140 may store, track, update, and provide data relating to the call processing that may take place at the central processing center 150. For example, the server 140 may store block/restricted call lists, authentication information, payment account information, recorded conversations, call logs, etc. In an embodiment, the server 140 may also act as a local internet for use by the inmates, as will be discussed in further detail below.

One or more single landline units 110 can be dispersed throughout the controlled facility, which are hardwired to the central processing center 150. Similarly, a landline bank 120 may include multiple landline units in a localized area. The landline bank 120 is also hardwired to the central processing center. Both the landline bank 120 and the landline units 110 can operate conventionally, and the central processing center 150 can handle calls to/from the landline bank 120 and the landline units 110 in accordance with conventional methods. However, it should be noted that in an exemplary embodiment, the addition of the multi-function wireless devices will cause little or no disruption to current configurations for providing and processing landline services. This allows for controlled facilities to easily and cost-effectively upgrade from their current landline services to a more diverse setup that includes the multi-function device configuration disclosed herein.

As discussed, in order to provide better call/data services to inmates, the inmates can be provided with multi-function wireless devices (e.g., 102 and 104). The wireless devices 102 and 104 may require significant configuration to ensure that they are used only for acceptable purposes, which will be discussed in further detail below. In an embodiment, the wireless devices 102 and 104 are configured such that their traditional radio communications are disabled or limited, and are instead configured to communicate only via short-range wireless communications, such as WLAN, Bluetooth, etc.

One or more wireless access points 130 is positioned throughout the controlled environment 100 in order to provide wireless connectivity to the wireless devices 102 and 104. The wireless access point 130 can be configured to provide such short-range wireless communication connectivity as used by the wireless devices 102 and 104. In an embodiment, the wireless access point 130 can be hardwired to the central processing center 150 via a hardline 135. In another embodiment, the central processing center 150 can include a wireless antenna 155 with which the wireless access point 130 can wirelessly communicate.

An inmate can initiate a call using the wireless device (e.g., 102 or 104) over a wireless link with the wireless access point 130 or directly with the wireless antenna 155 of the central processing center 150. For purposes of this discussion, it will be assumed that the call is communicated to the central processing center 150 via the wireless access point 130. The call data is transferred from the wireless device 102 to the wireless access point 130, which routes the call data to the central processing center either via the hardline 135 or wirelessly via the antenna 155. The central processing center 150 processes the call in the manners discussed above. In addition, the central processing center 150 may convert the call data from the internet protocol used by the wireless devices 102/104 and the wireless access point 130 into a public switched telephone network (PSTN) protocol for transmission to the third party. In an embodiment, this conversion may occur at the wireless access point 130 so as to minimize modifications to the central processing center. Alternatively, the call data can be converted into a cellular protocol, such as 3G, 4G, etc., and transmitted via the antenna 155 to a base station 190.

Incoming calls are similarly processed. The incoming calls are received by the central processing center 150 either wirelessly via the antenna 155 or over a PSTN network 195. The central processing center 150 processes the incoming call data and, upon successful processing, routes the call data to the wireless device 102/104. In an embodiment, the central processing center 150 may convert the call data from a PSTN protocol or cellular protocol to an internet protocol for transmission to the wireless device 102/104 via one or more of the antenna 155 and the wireless access point 130.

In an embodiment, a Radius server may be utilized to provide network access and control so that wireless devices can be authenticated to access the wireless network.

Further details regarding the operation of the various aspects of the multi-function environment 100 are described in detail below.

Multi-Function Device Overview

The wireless phone (e.g., 102 and 104) can vary in their specifications, provided that they meet certain criteria. In particular, the wireless phone should be capable of communicating over WLAN networks using one or more WLAN communication protocols, such as 802.11(a), 802.11(b), 802.11(g) and/or 802.11(n), among others.

In an embodiment, the wireless phones have sufficient technical specifications to efficiently run one or more "smartphone" operating systems, such as Blackberry OS, Android OS, and/or Apple iOS. This allows the wireless phones to operate on commercially available operating systems, and to be updated with future capabilities. Due to its open-source nature, in an embodiment, the wireless phones run Android OS, so as to allow for communication functionality to be customized in accordance with the present disclosure.

In an embodiment, the preferred base phone specifications, which will allow the device to effectively run Android OS in the controlled environment are: CPU MTK8377 dual core 1.2-1.5 Ghz, RM 512 MB, 4 GB NAND flash, strengthened glass composite, 4.3" TFT multi-touch capacitive touch screen, resolution 800*462 megapixel screen resolution, O.S. Android 4.0, Wi-Fi, WLAN 802.11a/b/g, FM Radio, front camera supporting zoom, auto focus and face focus, G-sensor, GPS, MP3, LED back light, microphone, independent clock chip and separate clock battery, ring indicator (audible and vibration), NiMH battery, ports: USB 2.0 data port, headphone, and DC power, and buttons: power, volume, and menu.

In an embodiment, the wireless device may be configured without an internal battery pack. Instead, the device may have an A/C charger that can be plugged into the A/C outlet in the inmates cell or common areas for immediate use. In addition, the device may have the ability to be fitted with an external battery pack for power.

In another embodiment, the wireless device can include an internal battery to facilitate ease of use. In an embodiment, as opposed to traditional smartphone batteries, the battery packs for the wireless device, whether internal or external, may be composed of a substance that does not cause trained cell phone detecting dogs (e.g., K-9 police units trained to detect cellular phones) to alert on the device. Because traditional smartphones use lithium-ion batteries, current cell phone detecting dogs are trained to the lithium-Ion battery scent. Therefore, in an embodiment, a NiMH battery may be used as the primary battery source.

Another common risk of allowing inmates to possess and maintain personal devices is that the inmates will find ways to tamper with the device mechanics, store contraband material inside the device case, etc. Therefore, in an embodiment, the wireless device case may be sealed. In other words, the device may be constructed with a housing that prevents the interior of the device from being readily accessible. In another embodiment, the device housing is constructed of a transparent material so as to allow the internals of the device to be readily examined without disassembly. Similarly, all accessories may also be constructed of transparent materials to aid examination. In an embodiment, the device can be designed so as to prevent tampering with the software, including the operating systems. For example, the software may be locked, such that access to certain functions and/or files is prohibited to the inmate.

The multi-function device may be configured to provide several services in addition to calling services. Such services may include: inbound and outbound calling, video visitation; voicemail; commissary ordering; law library access and other research tools; kite generation; paperless enablement services; email; multimedia download and/or streaming; and regulated internet access, among others. Any of these fees can deduct fees from the inmate Debit Account or Advance Pay Account.

Other functions and services available may include: app downloading and functionality; Inmate access, location and tracking using the GPS function or the WIFI function; IP TV; Educational video or audio content downloading and/or streaming; and inmate notifications (such notifications can be directed to an individual inmate, or broadcast to a group of inmates). It is also conceivable that inmate-to-inmate communication may be permitted for certain inmates. However, such communication should be carefully monitored and regulated. Inmate training materials and/or interactive courses can also be provided, as well as inmate games. Such games may provide the inmates means for friendly competition against each other.

Device Components

Figure 2:
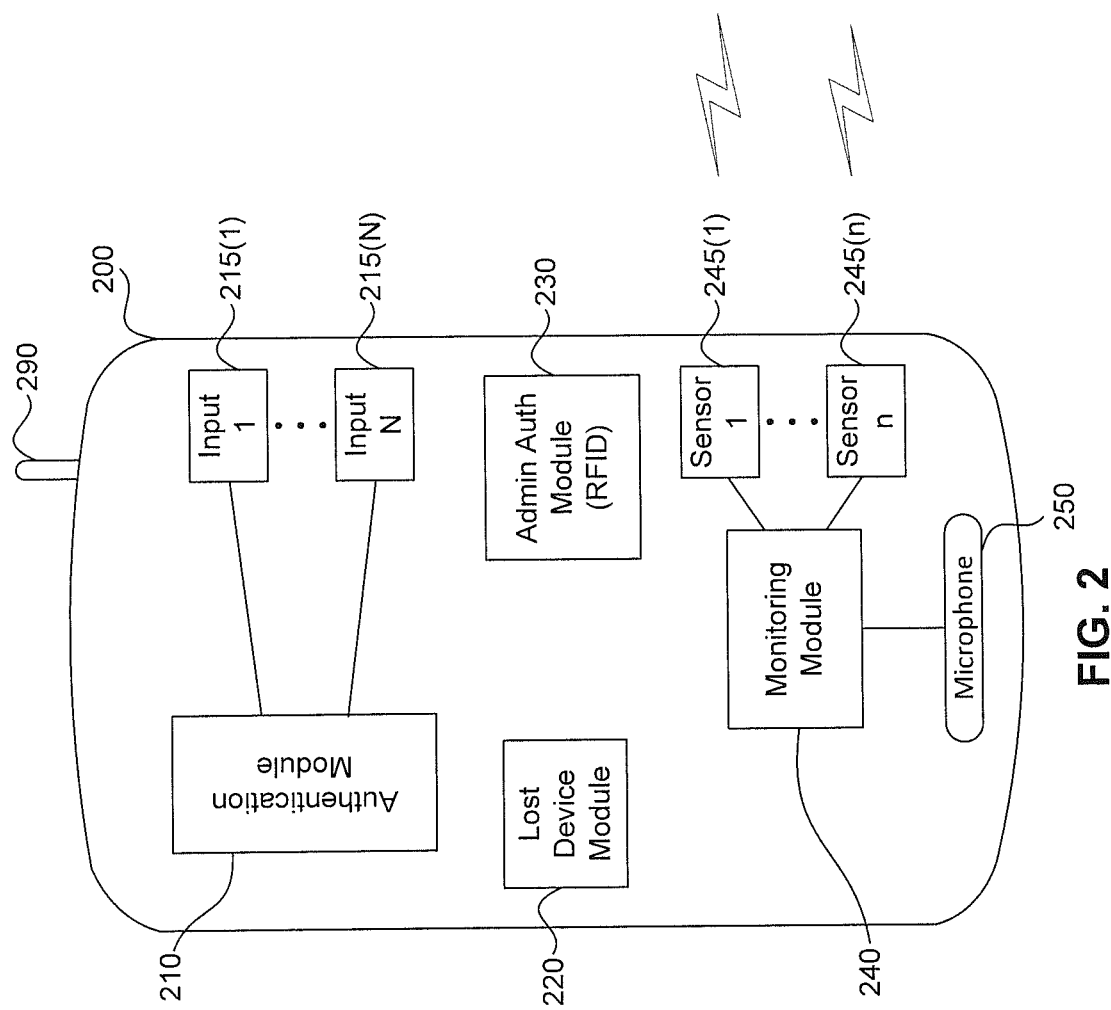
FIG. 2 illustrates an exemplary multi-function device according to an embodiment.

FIG. 2 illustrates an exemplary multi-function device 200 according to an embodiment. In addition to call and data processing modules and chips (not shown), the device 200 includes several other modules for performing specific functions relating to the security of the device 200 and/or the controlled facility as a whole.

For example, the multi-function device 200 may include an authentication module 210 for authenticating a user. The authentication module 210 prevents unauthorized inmates from using/hijacking the device from its owner. Such a theft could allow the thief to make calls to restricted numbers that are not restricted for the actual owner. In order to make its authentication, the authentication module 210 may be coupled to one or more input modules 215. For example, one or more input modules 215(1)-215(N), where N is a positive integer may be configured for receiving identifying information of a user, such as passcode, biometric (including facial recognition, fingerprint, voice, or other biometric data), motion input, or other authentication information. The input modules 215 collect and forward this information to the authentication module 210, which performs an authentication algorithm on the received information, usually comparing the received information to previously-stored authentication information. A successful algorithm results in the device 200 being unlocked and permitted for use. A failed algorithm results in the locking of the device 200, thereby preventing the improper use.

In an embodiment, the device 200 can be configured to require the continuous or repeated input of authentication information during device usage. Once the device 200 has been successfully unlocked through the authentication of input information, the inmate may then be required to continue to provide the input information for continued authentication. For example, the inmate may be required to keep a finger on a fingerprint pad or keep the device camera aimed at the inmate's face/eyes for continued authentication. Other forms of authentication information can continue to be monitored during device usage. Such information may be monitored continuously, or at brief intervals. A failure to provide such authentication information at any given time (for continuous monitoring) or at any given authentication interval (for interval monitoring) will cause the device 200 to re-enter lock-down mode and terminate or suspend device usage until the authentication information is newly provided. This can prevent any number of situations in which one inmate unlocks his own device (whether by choice, threat, or force) and provides the unlocked device to another inmate for unauthorized usage.

The multi-function device may also include a lost device module 220. The lost device module 220 is configured to detect that the device 200 is "lost." This prevents the device 200 from being found by an unauthorized inmate and used for improper purposes. In an embodiment, the lost device module 220 may include a clock timer that continuously monitors an amount of time since the device was last used. Once the timer reaches a threshold value, the lost device module 220 identifies the device as "lost" and locks the device. It should be understood that the threshold value can be on the order of minutes, days, months, or other durations of time. In an embodiment, the lost device module 220 operates on an independent power source that can continue to supply operating power to the lost device module 220 for at least the threshold value of time.

The device 200 may also include an administrative authentication module 230. The administrative authentication module 230 may constitute a quick access tool for use by administrative personnel to quickly and easily gain access to the device 200, whether for monitoring, configuring, or other purposes. In an embodiment, the administrative authentication module 230 includes an RFID detector. Upon detection of the presence of an administrative RFID tag/card, the administrative authentication module 230 can provide administrative access of the device 200. In another embodiment, the administrative authentication module 230 may provide control to administrative personnel to the device remotely. In this manner, administration may effectively "hijack" the device, removing control of the device from the user, to perform various administrative tasks.

In an embodiment, the multi-function device can include a camera. For security purposes, and to ensure proper use, the multi-function device may be configured with hardware, software, and/or firmware to operate the camera during a call. By running the camera, the multi-function device can require that the inmate's face remain "in-frame" in order to prevent improper use of video conferencing services. The inmate's face can also be matched to a recorded face using facial recognition processing. This ensures that only the assigned inmate is using the device, and helps to prevent unauthorized/unpermitted use.

Remote Monitoring for Investigation Work

The device 200 may also include a monitoring module 240. Monitoring of inmate activities is often extremely important in controlled facilities, such as prisons. Therefore, the monitoring module 240 can be configured to perform such monitoring, and provide data gathered during the monitoring to the central processing center 150 for administrative analysis. The monitoring module 240 may be coupled to one or more sensors 245 that provide the monitoring module 240 with sensed information. In an embodiment, the sensors 245(1)-245(n) (where n is a positive integer) can include location sensors (such as GPS, WiFi triangulation, Access Point detection, etc.), movement sensors (such as accelerometers, interpolators, etc.), visual sensors (such as cameras, luminometers, etc.), audio sensors (such as microphones, etc.), and others. In an embodiment, the microphone 250 used for communication can be used during periods of inactivity to provide audio data to the monitoring module 240 for processing. The microphone can be configured to operate and detect audible data even when the device 200 is powered off, so as to allow administrative personnel to monitor conversations.

In an embodiment, at least one of the sensors includes a camera (video or still image). Much like the microphone, the camera can be configured to operate during powered-off periods, and can be configured to be activated remotely by administrative personnel. Video data can be forwarded to the monitoring module 240 for processing and/or transmission to the central processing center 150.

Likewise, remaining sensors 245 may be configured to be activated remotely by administrative personnel. For example, the GPS can be turned on remotely, a ringer can be sounded (e.g., for inmate locating, etc.), etc. Many other configurations and/or uses of the various sensors may be contemplated for monitoring purposes that are within the scope of the present disclosure.

Call and Data Processing

As previously discussed, with minor modifications to the facility infrastructure, the wireless calls routed to/from the multi-function device can be processed by the central processing center 150 that is already in place for processing landline calls. This will allow the facility to use the existing investigative, administrative, control and reporting functions of its present system for both wired and wireless calls.

The central processing center 150 is configured to connect outgoing calls originating from the device based on one or more factors provided that the inmate has a sufficient balance in his Debit account. Similarly, the central processing center 150 is configured to connect incoming calls originating from outside the facility to the inmate provided that the calling party has a Friend/Family AdvancePay Account with a sufficient balance. It should be noted that account balances may constitute only one factor of multiple factors that are considered before connecting calls. Such additional factors may include authentication, restricted call processing, three-way call detection, etc.

Deposit Accounts

As discussed above, in order to allow for an inmate to quickly and efficiently make outgoing calls, the central processing center 150 can determine whether the inmate has sufficient funds for making the call based on an inmate Debit Account associated with the particular inmate. In an embodiment, the inmate Debit Account can be stored in one or more databases inside or out of the environment 100. For example, the Debit Account can be stored and managed in the server 140 within the system, or can located and accessed remotely, such as at a financial institution, for example. In an embodiment, a single Inmate Debit Account can be used to support both landline and wireless phone calls. The Debit Account will be used only to pay for phone calls.

As another form of advance payment, an Advance Pay Account can also be associated with the inmate. The Advance Pay Account can be funded by family and friends, and used for call fees associated with the inmate. As with the Debit Account, the central processing center 150 can access the Advance Pay Account to determine that there are sufficient funds, when outgoing or incoming calls are received. In an embodiment, the Advance Pay Account is stored in the server 140. In an embodiment, the Advance Pay Account can support both the landline and the wireless phone calls. In an embodiment, the Advance Pay account will be used only to pay for phone calls to (and from, in the case of wireless) the associated phone number.

In an embodiment, the central processing center 150 can be configured to prompt the caller to select the Debit Account or the Advance Pay Account for supplying the funds for completing the call. For example, the central processing center 150 can prompt the inmate, upon receipt of an outgoing call from the inmate, as to whether funds should be drawn from the Debit Account of the Advance Pay Account for completing the call. The an embodiment, the prompt is only provided to the inmate, and incoming calls are restricted to funds of one of the Debit Account or the Advance Pay Account.

In an embodiment, the Debit Account and/or Advance Pay Account can be used to pay for data usage, and/or downloads requiring payment, such as apps, video streaming services, etc.

Calls

Figure 4:
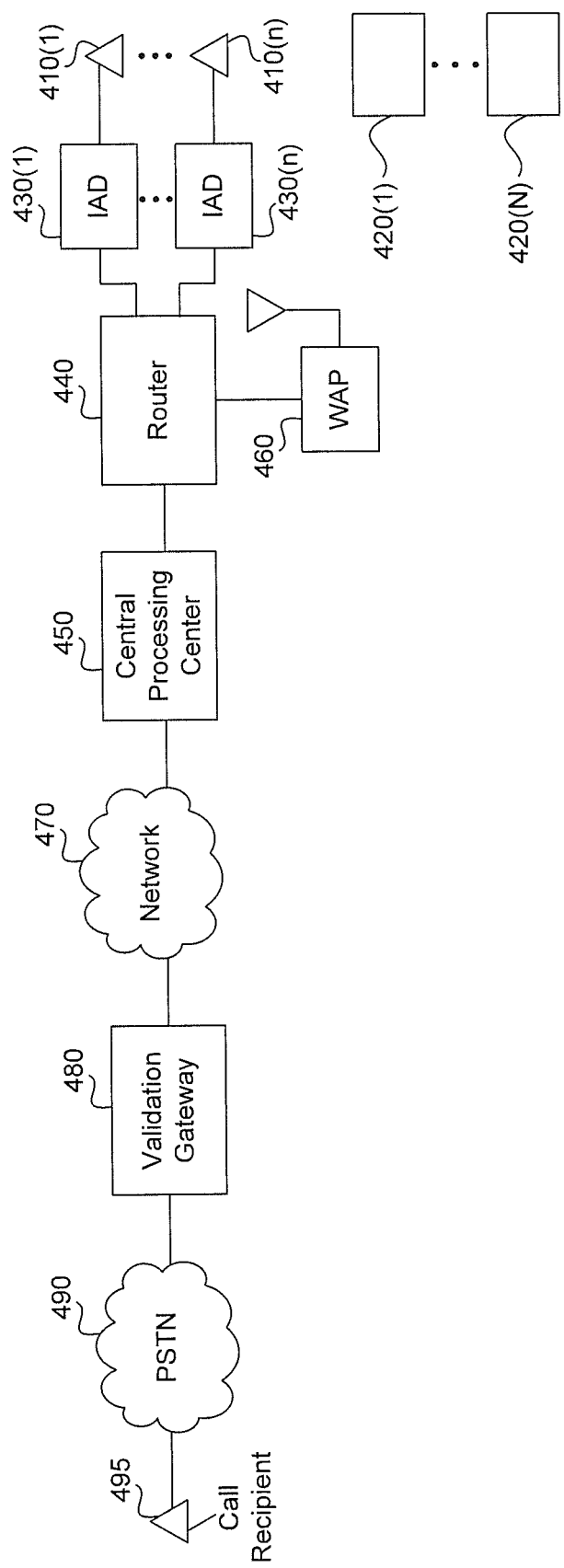
FIG. 4 illustrates an exemplary system for processing the outgoing call.

FIG. 4 illustrates an exemplary system 400 for processing the outgoing call.

As shown in FIG. 4, a plurality of wired calling stations may be wired to corresponding internet access devices (IADs) 430 for providing the wired calling stations network access to the central processing center 450. The central processing center 450 may represent an exemplary embodiment of the central processing center 150. The IADs 430 are communicatively coupled to a router 440 for transferring data between the IADs 430 and the central processing center 450. A wireless access point (WAP) 460 is coupled to the router 440, and provides wireless data communication with a plurality of wireless devices 420. The wireless devices 420 may represent exemplary embodiments of the wireless devices 102 and 104. The central processing center 450 processes call data in accordance with the above description, and routes outgoing calls to a validation gateway 480 (discussed below) via a network 470. In an embodiment, the network 470 is a cloud network. The validation gateway 480 forwards the call over a public switched telephone network (PSTN) 490 to a recipient device 495.

Outbound Calling

Figure 3:
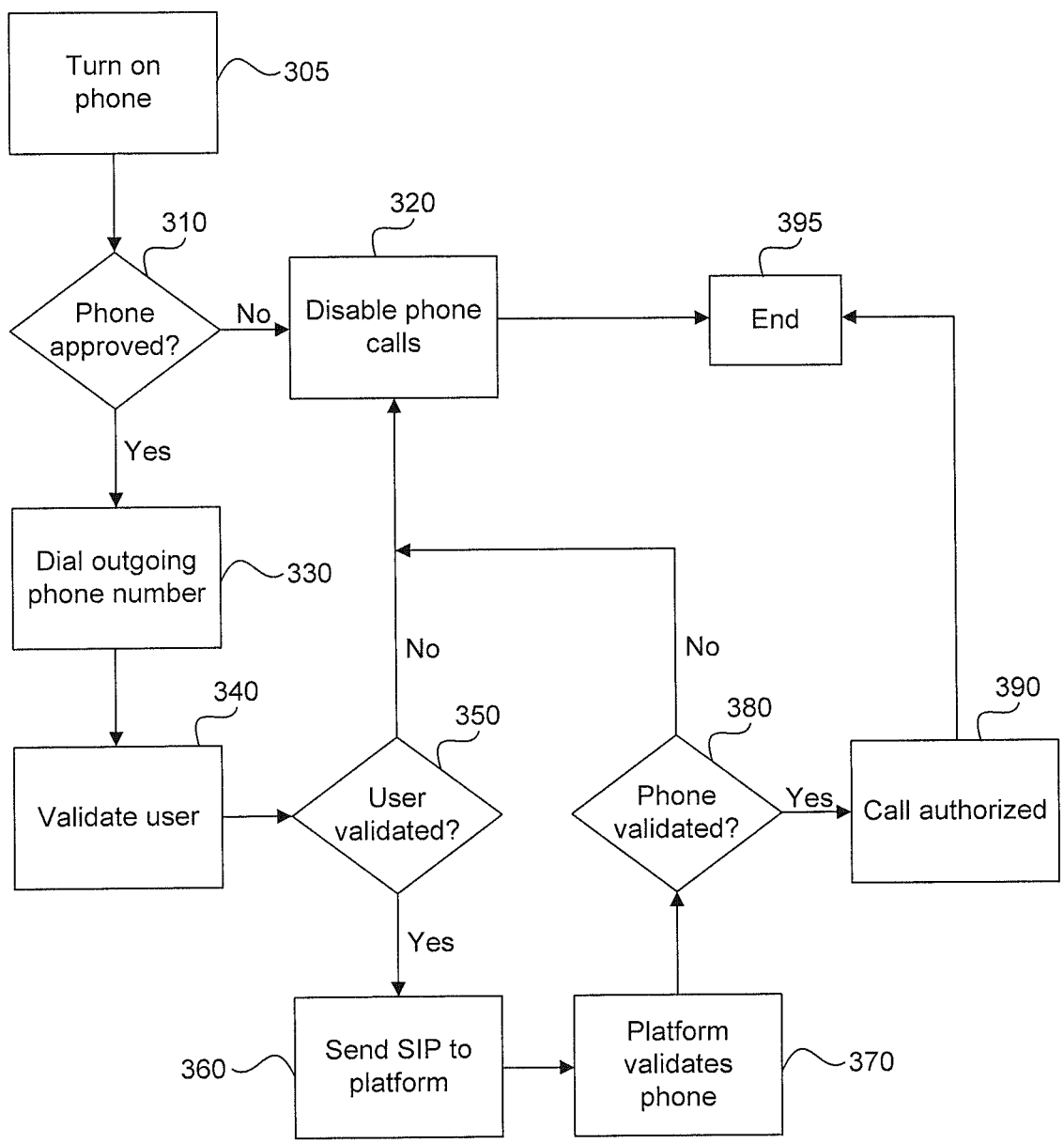
FIG. 3 illustrates a flowchart diagram of a method for performing an outbound call from the device to an outside called party in the communication system.

FIG. 3 illustrates a flowchart diagram of a method for performing an outbound call from the device 200 to an outside called party in the communication system 100. The method 300 will now be described relative to the system depicted in FIG. 4.

The method begins when a wireless device is turned on in step 305. Upon being turned on, the device 420 syncs with the wireless network. In step 310, the network determines whether the device is authorized to operate on the facility network. If the device is not authorized, then phone calls are disabled in step 320 and the method ends in step 395. Alternatively, if the phone is authorized, the phone is permitted to make a call utilizing the wireless network.

In step 330, the wireless device 420 dials an outgoing phone number. In step 340, the central processing center 450 validates a user of the device 340. In an embodiment, validation can be performed on the phone itself. At step 350, a determination is made as to whether the user is valid. If the user is not valid, phone calls are disabled in step 320 and the method ends in step 395. Alternatively, if the user is validated, the user is permitted to proceed with his call attempt and the method proceeds to step 360.

In step 360, the user's device 420 sends a session initiation protocol (SIP) signal to the central processing center 450. Upon receipt of the SIP signal, the central processing center 450 validates the phone in step 370. In step 390, a determination is made as to whether the dialed phone number is valid. If the phone number is not valid (e.g., restricted, does not exist, etc.), the phone call is disabled for the device 420 in step 320 and the method ends in step 395. If the phone number is valid, the call is authorized in step 390. The method then ends in step 395.

Inbound Calling

Figure 5:
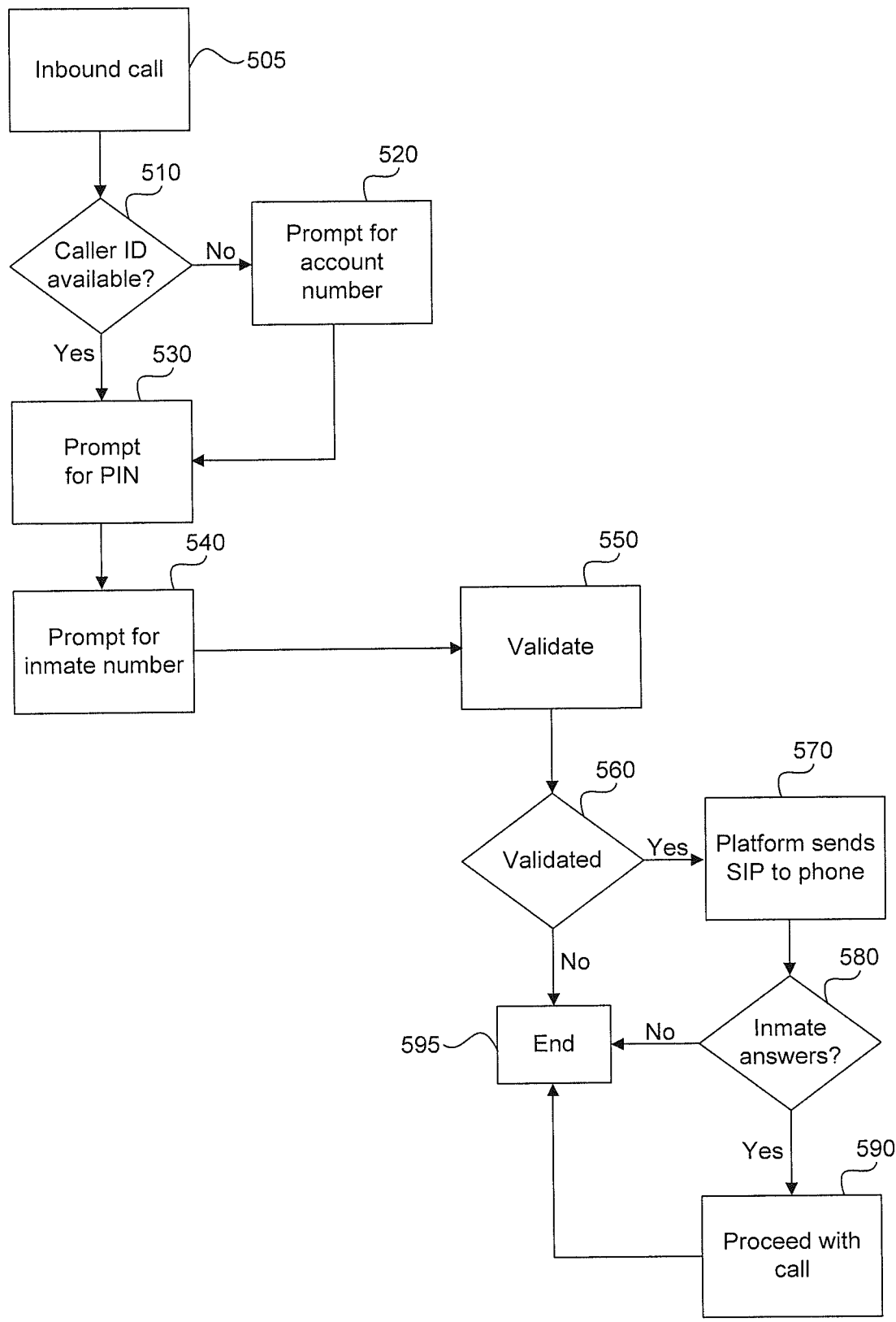
FIG. 5 illustrates a flowchart diagram of a method for performing an inbound call from an outside calling party to an inmate using the device in the communication system.

FIG. 5 illustrates a flowchart diagram of a method for performing an inbound call from an outside calling party to an inmate using the device 200 in the communication system 100. The method 300 will now be described with reference to the system depicted in FIG. 4.

In step 505, an inbound call is made from an outside device 495. The call is received by the central processing center 450 via the validation gateway 480, which checks whether caller ID is available in order to identify the calling party in step 510. If the caller ID is not available, the central processing center 450 prompts the caller for an account number in step 520. The method then proceeds to step 530. If the caller ID is available, the central processing center extracts the caller information and proceeds to step 530.

In step 530, the central processing center 450 prompts the caller for a PIN (personal identification number). In step 540, the central processing center 450 prompts the caller for an identification of the inmate with whom the caller wishes to contact. Based on this acquired information, the central processing center 450 performs a validation algorithm of the incoming call in step 550. In step 560, if the call is not validated, the method ends in step 595. Alternatively, if the call is validated in step 560, the central processing center seeks out the inmate device.

In step 570, the central processing center sends a SIP signal to the inmate device 420. In step 580, a determination is made as to whether the inmate has answered the call. If the inmate answers, the call proceeds in step 590, and the method ends in step 595. Alternatively, if the inmate does not answer, the method immediately ends in step 595.

In an embodiment, the validation gateway 480 may be configured to acquire the call information and perform call validation. The Validation gateway would answer and ask for the inmates phone number, PIN created during registration, etc. The validation gateway 480 can be configured with knowledge of the inmate location, phone number, PIN, IP address of the call processing system for the facility and the balance in the wireless account associated with the inmate. The Validation gateway 480 could also include a blocked number list of all inmate wireless phones as part of its validation. The validation gateway 480 would route the call to the correct call processing system trunk group.

In another embodiment, inbound calls can be provided to the inmate by providing a website/IVR to allow family members (or others, hereinafter referred to as "the family") to register for inbound calling. The website/IVR should allow the family to select an inmate from a facility list and give them the inmate's phone number. The website/IVR will also prompt the family to create a PIN that is used when calling the inmate to eliminate CID spoofing. The website/IVR would also allow the family to deposit money into the inmate wireless account.

A Trunk group for inbound calls at the call processing platform can be configured to answer the call and receive the data associated with the called inmate. The Call Processing platform would ask for the Family member to state their name and record name (voice recognition if required).

In an embodiment, the inmate can be prompted to accept or deny the call. The call is then only completed upon The call processing system would ask the inmate to accept the call and record the inmates name for Voice recognition. Once accepted the call processing system would complete the call.

In another embodiment, the validation gateway 480 or the central processing center 450 can be configured to send a message (SMS, MMS, facility announcement, page, etc.) to the inmate informing him/her of the call. The inmate would then be required to perform an outbound call in order to connect to the calling party.

Other Products and Services

Although the multi-function devices can be provided to inmates to simplify their communication abilities with outside friends and family, in an embodiment, the multi-function device can also provide various data services to the inmate. These data services should be monitored substantially in the manner described above with respect to telephone calls. For example, data services can be filtered, paid for by Deposit Accounts and/or Advance Pay Accounts, and recorded for analysis or monitoring. In an embodiment, email, instant messaging, social media sites, and other forms of personal or mass communication may be restricted by one or more content filters.

In an embodiment, the central processing center 150 can route data requests and traffic to the server 140. The server 140 can provide the filtering and data processing services needed to connect the inmates to a restricted internet, app store, app server, database, etc. that may be used by the multi-function device. In an embodiment, the server 140 itself can include a substantially abridged virtual internet that provides limited data accessibility to the inmates.

In an embodiment, multi-media can be accessed and downloaded to the device, whether by viewing, storing, and/or streaming. Such multi-media may include music, email, and video services. In an embodiment, the inmate can have video visitation using video-conferencing data transmissions with an outside entity.

The multi-function device may also be configured to permit text messaging. In an embodiment, text messages sent from the inmate will only be routed to a desired recipient if that recipient first "opts in" to receiving such communications. In other words, an outside party with whom the inmate seeks to text message may be asked to authorize the receipt of such text messages.

The multi-function device may be configured to support downloadable apps, which the inmate may be able to download from a publicly-available appstore, or which are stored on the server 140. Further, by supporting the running of apps, the multi-function device can be configured to receive and install apps at the directive of an administrator. Such apps may facilitate monitoring of the inmate, or may serve a more educational purpose, such as an ebook app, etc. Other types of apps may be forwarded to the device for varying purposes.

As discussed above, the multi-function device may be configured to receive and play back video content, either at the directive of the inmate or an administrator. Video content supplied by the administrator may be for purposes of education, training, notification, or other purposes. Proprietary video content may be limited by viewing restrictions by copyright holders.

In an embodiment, the multi-function device 200 does not actually store the various data services programs and apps that the inmate uses. Instead, these programs can be stored on the server 140 or some other remote location. The server 140 performs the processing associated with actually using the various software used by the inmate device and provides the inmate with functional access to the programs through a web-browser, proprietary, or other user interface.

As an example, the inmate may load a web-browser stored on the device 200. The web-browser can be configured to automatically load to a home page that provides links to the inmate's various software options and other frequently-visited or important websites. Upon clicking on a link to a particular program, the device 200 will send a command to the server 140 via the central processing center 150. The server 140 receives the command and proceeds to run an iteration of the selected program. The server 140 then populates a web page that provides various commands, such as controls for the program, and information to the inmate. The browser on the client's device displays the webpage received from the server 140, and the inmate is able to control the application running on the server remotely via the webpage. Additional commands instituted by the inmate cause further processing at the server 140 using the corresponding application, and the server may reconfigure the webpage or construct new webpages to allow the inmate to experience the use of the application without having the software loaded directly onto his device. Although the above example uses a server to construct web pages to provide control to the inmate, the disclosure is not limited to this example, as other entities remote from the device 200 can be used to run applications, and other user interfaces may be used to provide inmate control of those applications.

Content Purchasing and Update Functions

As discussed above, an embodiment allows the inmate to download content via the internal wireless network of the facility. This functionality can also be extended to downloading device updates. However, other embodiments exists that can be substituted or combined with the above, to provide alternative/additional options for acquiring data content.

In an embodiment, one or more kiosks may be disposed within the controlled facility. The multi-function device can include one or more ports to facilitate connection with the kiosk. The kiosk may function as a diagnostic center for the device, as well as for a data hub. By functioning as a diagnostic center, the kiosk may automatically run diagnostic processes on the device to detect any tampering and to ensure all software/firmware is up to date. When tampering is detected, the kiosk may issue a "lock" command to the device to prevent its further use. When certain software/firmware is detected to be out-of-date, the kiosk may automatically cause the updated versions to be installed on the connected device. In an embodiment, removal of the device prior to completing the update may cause the device to automatically lock down.

Upon connecting to the kiosk, certain data may automatically be transferred to the multi-function device. Such information may include software and/or firmware updates, for example. Similarly, certain other data may automatically be transferred to the kiosk from the multi-function device, such as monitoring information, for example.

The kiosk may be configured with a browser for allowing the inmate to view and select certain permitted data to be transferred to his device. Such data may include apps, multi-media content, among others. The kiosk may have access to the server 140 for retrieving funds from the inmate's Debit Account and/or Advance Pay Account to pay for downloaded content. The kiosk may also facilitate internet browsing, either through a filter to the general internet, or on the server on a reduced intranet.

In an embodiment, rather than connecting via a kiosk, the multi-function device can be configured to receive updates and select data via the facility network or a cloud network. Despite having access to certain screened and necessary content, in an embodiment, the inmate may be prohibited from accessing the general internet.

Device Assignment and Inmate Release

Although multi-function devices may be provided to an inmate upon his entry into the facility, due to the cost associated with supplying and maintaining devices, the inmate may instead be required to purchase or provide a deposit in exchange for their device. The fee associated with receiving the device can be provided from the inmate's Debit Account or Advance Pay Account. In an embodiment, the fee may constitute a licensing fee rather than a purchasing fee. Consequently, the inmate will not actually own his device, even though they may own content purchased for the device.

Once the inmate has paid for his device, a phone number must then be assigned to the device. In an embodiment, inmate phone numbers can be assigned by the facility managers. Alternatively, the inmate may be permitted to select his own number, such as his personal phone number prior to entering the facility. Under the FCC's phone number portability plan, the inmate could select his/her previous cell phone or home phone number for easy memorizing, and could be reissued that number upon release from the facility.

In an embodiment, upon release, the inmate may be required to return the device to either a manufacturer or facility managers/operators.

If the inmate wishes to keep the content they have purchased and downloaded and move it from the multifunction device to a commercially available alternative, a nominal content transfer fee (e.g. $20) may be instituted. Effectively, an inmate returning a device in good working order can get their content back for free, net of the device buyback fee. The purchased content may be returned to the inmate either by giving them log-in information to a special website set-up for this purpose, or else arrange with a device provider "partner" to move the content onto a new device, which can then be mailed to the inmate. The contents can also be moved to a dual mode phone (family plan phone) so that the inmate can become a customer of the cell phone service plan for released inmates.

Facility Wifi Infrastructure

One challenge associated with installing a WiFi infrastructure in a prison is how to provide reliable networking, preferably wireless, into prison pods with good distribution while minimizing construction and installation costs. In particular, prison pods are designed to be notoriously difficult to penetrate. In addition, due to various restrictions such as for example restrictions on boring holes, inmate access to exposed wiring, and general access problems to chases and conduits, wiring is generally difficult in inmate pods. High security cells, such as completely walled cells with steel doors, pose even further problems. Further, power is often only available in limited areas. However, occasionally some cells are fitted with AC power outlets.

Typical costs for WiFi distribution may be found in the following Table 1:

TABLE 1

Costs for WiFi distribution

| Network Technology | Typical Application | Endpoint Distribution Method | Typical Endpoint Cost |
| --- | --- | --- | --- |
| Wired (Cat5/6) | General Networking | Wired | <$40 |
| WiFi (802.11x) | General Endpoint Distribution | Wired | <$100 |
| HPNA | Residential Video, Set top boxes | Coax | <$100 |
| BPL (IEEE1901) | General Endpoint Distribution, typically residential, power utility telemetry | AC Power | <$100 |

FIGS. 6A-6D illustrate various configurations for wiring a network within a controlled facility utilizing the above technologies. In each configuration, an access point 610/620 is connected to a router 630 via one or more communication channels. The router 630 provides communication with an internet or intranet 690 to the access point 610/620. In each embodiment, the access point 610/620 may receive operating power via an AC power connection 640.

Wired Cat 5/6

Figure 6A:
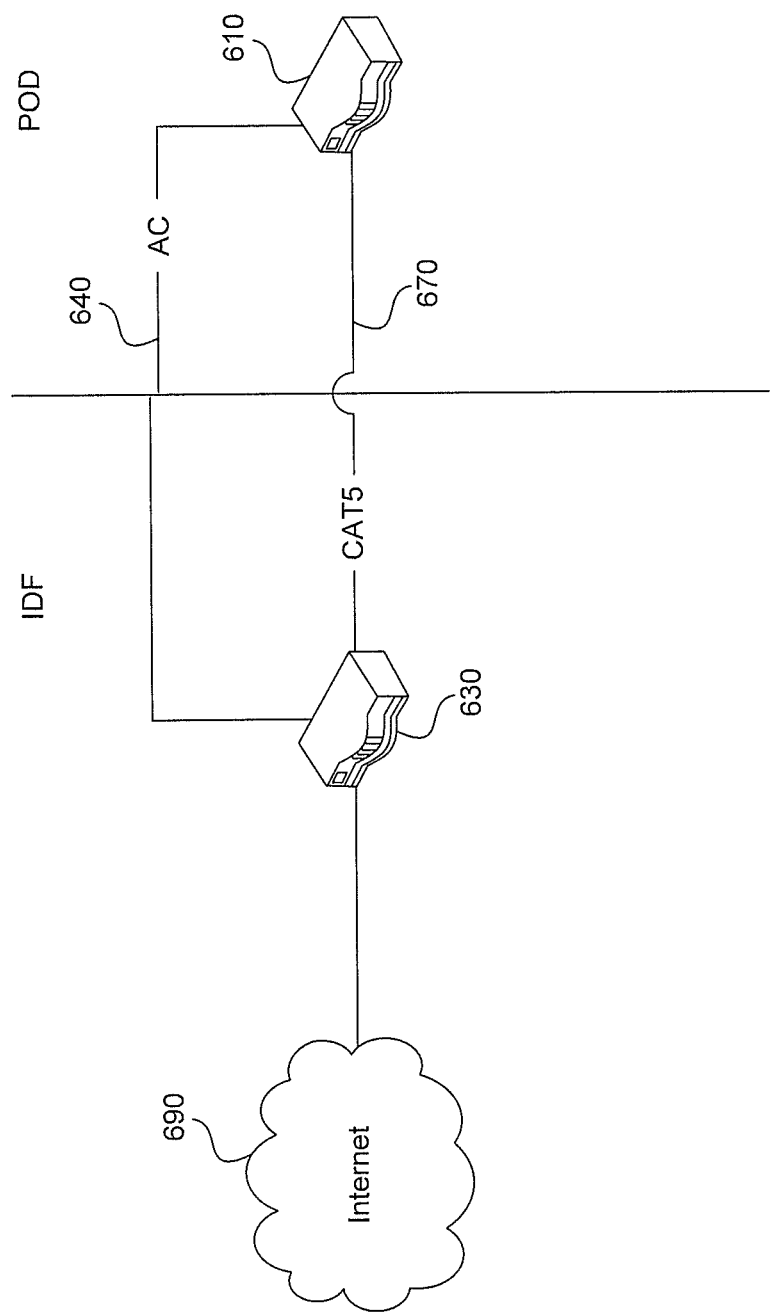
FIGS. 6A-6D illustrate various configurations for wiring a network within a controlled facility utilizing the above technologies.

FIG. 6A illustrates an exemplary configuration using a wired Cat 5 infrastructure. Using this technology, the access point 610 is connected to the router 630 via a Cat 5 cable 670. The access point 610 may comprise a wired Ethernet jack (standalone or on a PC) or a wireless access point. The Cat 5 communication link 670 provides data speeds of 10/100 Mbps. The number of users is limited to number of jacks, typically four. This option is moderately inexpensive (approximately $34) and provides a benefit of being a Reliable network.

Traditional WiFi Wireless Networking

Figure 6B:
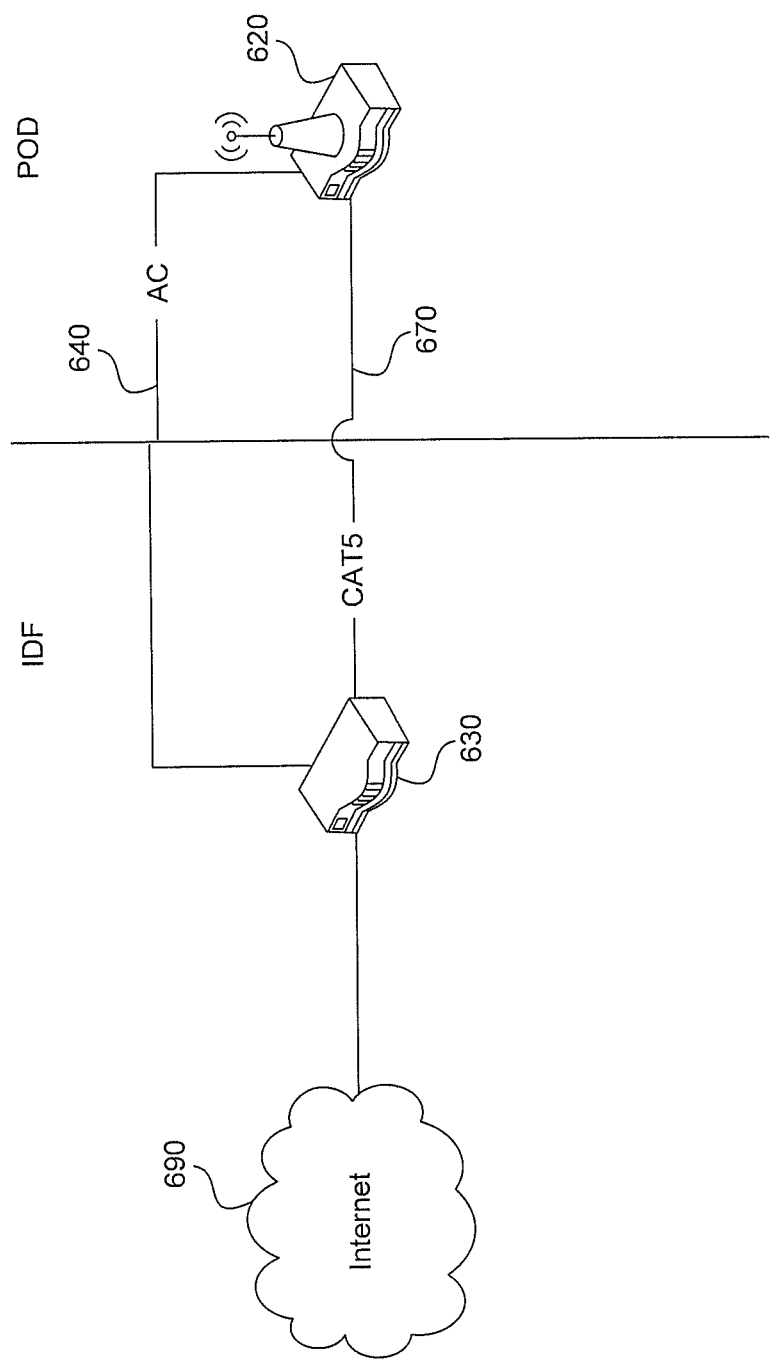

FIG. 6B illustrates an exemplary configuration using a traditional wireless networking infrastructure. Using this technology, the access point 620 may be connected to the router 630 over a Cat 5 cable 670. The access point 620 may comprise an Ethernet jack (standalone or on a PC) or a wireless access point, and may provide speeds of greater than 100 Mbps. This option is moderately expensive (approximately $50-$100), but has a benefit of providing wireless service distribution.

HPNA

Figure 6C:
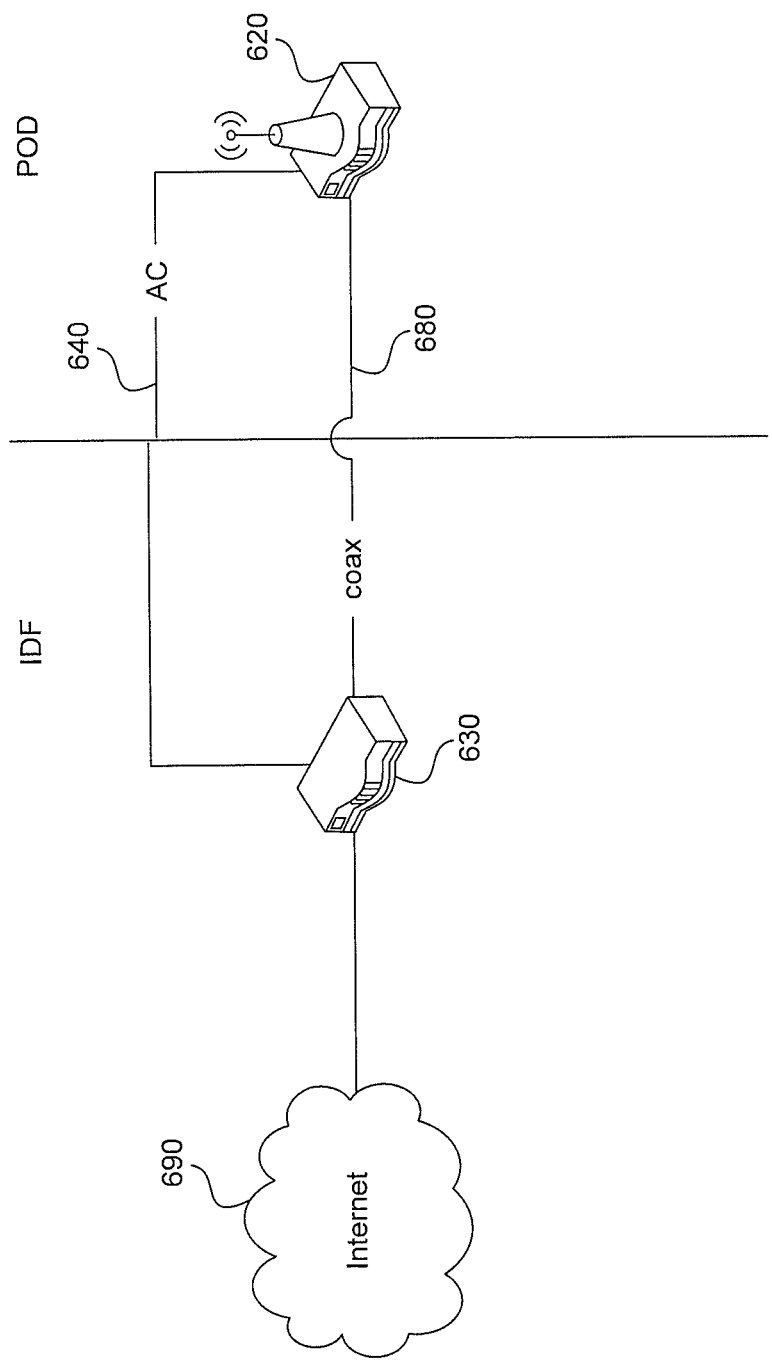

FIG. 6C illustrates an exemplary configuration using an HPNA infrastructure. Using this technology, the access point 620 may be connected to the router 630 via a coax cable 680. One advantage to this configuration is the ease of installation in cells already configured for coaxial television or other data services. The access point 620 may comprise an Ethernet jack (either standalone or on a PC) or a wireless access point. The coax cable 680 may provide data speeds of up to 320 Mbps, and can have up to 61 endpoint users. Despite being relatively expensive (greater than $100), this configuration can be beneficial by using pre-installed wiring. If such wiring has not been installed, the cost will rise significantly.

Broadband Over Power Line (BPL)

Figure 6D:
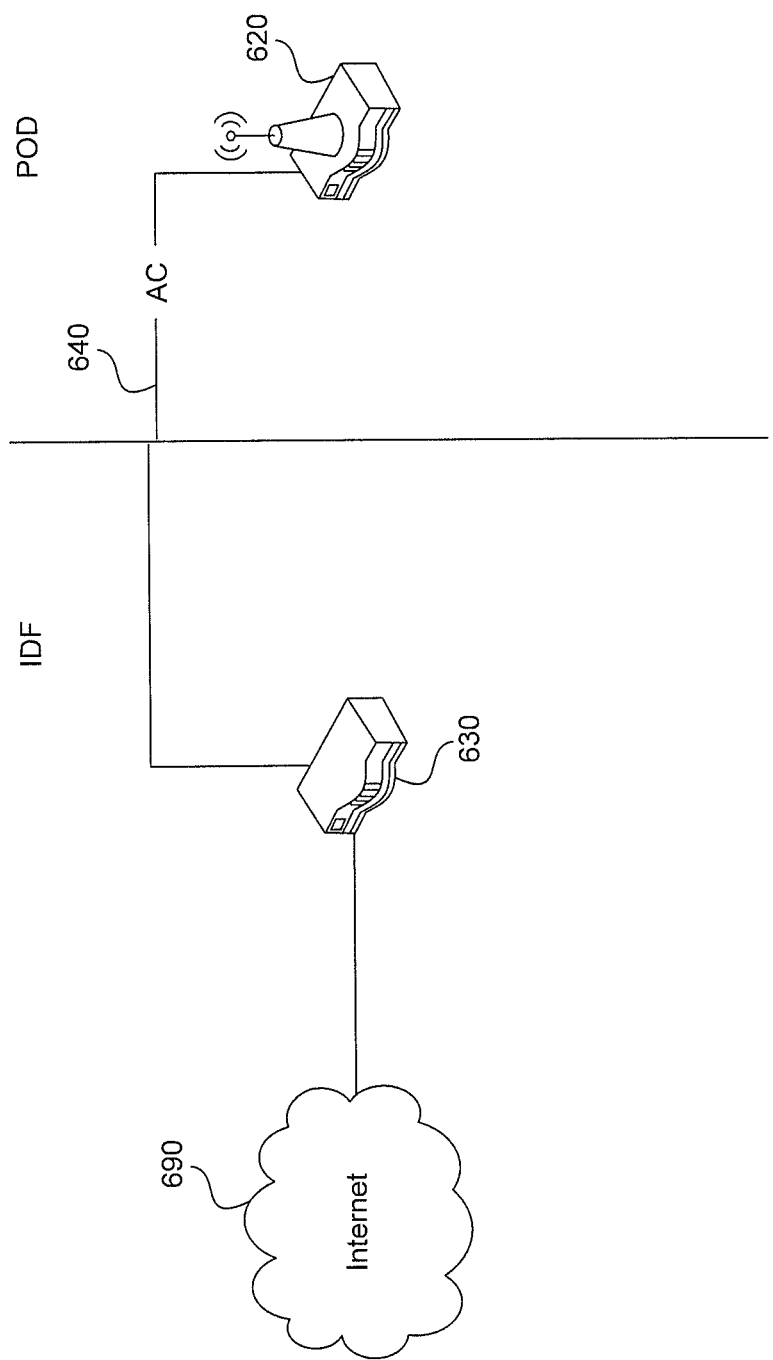

FIG. 6D illustrates an exemplary configuration using a BPL infrastructure. Using this technology, there is no dedicated data connection between the access point 620 and the router 630. Instead, the access point 620 communicates with the router 630 over existing AC power supply wiring. The access point 620 may comprise an Ethernet jack (standalone or on a PC) or a wireless access point. This configuration may provide data speeds of between 250-500 Mbps, and can have up to 16 endpoint users. Despite being relatively expensive (greater than $100), this configuration may be particularly beneficial by utilizing common power supply lines. However, this configuration may suffer from its electrical interface (e.g., motors), and its limitations on number of connected endpoints.

Conclusion

Each of the above infrastructure options has various advantages and detriments, which should be carefully considered based on the current wiring of the facility as well as the facility's ability to be modified with additional/alternative wiring. This determination may vary from cell to cell. Thus, each installation location should preferably be surveyed to determine which one or combination of the above options is preferred to provide the wall-to-wall WiFi connectivity needed to serve the inmates with an acceptable communication solution.

FUTURE CONSIDERATIONS

Providing all of the communications services may become less costly with the introduction and deployment of the Next Generation Networks (NGN) and switching systems. These networks provide for the cost effective support of video, data and VOIP over the same bandwidth services.

The wireless device and corresponding infrastructure can be designed/modified to support the NGN systems.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. An inmate kiosk for use in a controlled environment facility, comprising:
   a memory;
   a device interface configured to provide a communication interface with a personal inmate communication device; and
   one or more processors and/or circuits configured to:
      detect the personal inmate communication device via the device interface;
      initiate communication with the personal inmate communication device in response to the detecting;
      perform a diagnostic process on the personal inmate communication device, the diagnostic process including identifying tampering with the personal inmate communication device;
      in response to the diagnostic process identifying no tampering with the personal inmate communication device, upload selected media selected by an inmate to the personal inmate communication device via the device interface; and
      in response to the diagnostic process identifying tampering with the personal inmate communication device, issue a lock command to the personal inmate communication device via the device interface configured to cause the personal inmate communication device to enter a locked state, the locked state being initiated by software denying access to at least one function and at least one file.

2. The inmate kiosk of claim 1, wherein the diagnostic process identifies at least one software module installed on the personal inmate communication device for which an update is available.

3. The inmate kiosk of claim 2, wherein the one or more processors and/or circuits are further configured to:
   in response to the identifying of the at least one software module, transmitting to the personal inmate communication device, via the device interface, an update file associated with the at least one software module and an update instruction that causes the personal inmate communication device to install the update file.

4. The inmate kiosk of claim 3, wherein the one or more processors and/or circuits are further configured to:
   detect that the personal inmate communication device was disconnected from the device interface prior to completion of the transmitting; and
   communicate with a backend to cause a lock instruction to be sent to the personal inmate communication device.

5. The inmate kiosk of claim 1, further comprising an input device, wherein the one or more processors and/or circuits are further configured to:
   list available media in a browser, navigable by the inmate; and
   receive a selection of the selected media from the inmate via the input device.

6. A method for updating a personal inmate communication device in a controlled environment facility, the method comprising:
   detecting the personal inmate communication device via a device interface;
   interfacing with the personal inmate communication device;
   initiating communication with the personal inmate communication device in response to the detecting;
   performing a diagnostic process on the personal inmate communication device, the diagnostic process including determining that the personal inmate communication device has been tampered with;
   in response to the diagnostic process identifying no tampering with the personal inmate communication device, uploading selected media selected by an inmate to the personal inmate communication device via the device interface; and
   in response to the diagnostic process identifying tampering with the personal inmate communication device, issuing a lock command to the personal inmate communication device, via the device interface, to cause the personal inmate communication device to enter a locked state, the locked state being initiated by software denying access to at least one function and at least one file.

7. The method of claim 6, further comprising identifying, by the diagnostic process, at least one software module installed on the personal inmate communication device for which an update is available.

8. The method of claim 7, further comprising, in response to the identifying of the at least one software module, transmitting to the personal inmate communication device via the device interface an update file associated with the at least one software module and an update instruction that causes the personal inmate communication device to install the update file.

9. The method of claim 8, further comprising:
   detecting that the personal inmate communication device was disconnected from the device interface prior to completion of the transmitting; and
   communicating with a backend to cause a lock instruction to be sent to the personal inmate communication device.

10. The method of claim 6, further comprising:
    listing available media in a browser, navigable by the inmate; and
    receiving a selection of the selected media from the inmate via the input device.

11. A personal inmate communication device for use in a controlled environment facility, comprising:

a memory that stores a software application;

a kiosk interface configured to communicate with a facility kiosk; and a processor configured to:
- detect that a communication interface with the facility kiosk has been established;
- automatically transmit diagnostic information to the facility kiosk via the kiosk interface, the diagnostic information including at least one setting indicative of whether the personal inmate communication device has been tampered with;
- in response to the diagnostic information indicating that the personal inmate communication device has not been tampered with:
  - receive an update package from the facility kiosk that includes a software update for the software application; and
  - install the software update in response to receiving the update package; and
- in response to the diagnostic information indicating that the personal inmate communication device has been tampered with, receive a lock command from the facility kiosk via the device interface that causes the personal inmate communication device to enter a locked state, the locked state being initiated by software denying access to at least one function and at least one file.

12. The personal inmate communication device of claim 11, wherein the software application is out of date.

13. The personal inmate communication device of claim 11, further comprising an input device, wherein the locked state prevents processing of inputs provided to the input device.

14. The personal inmate communication device of claim 11, wherein the locked state prevents access to the device interface until unlocked by an authorized administrator.

15. The personal inmate communication device of claim 11, wherein the processor is further configured to:
- detect a disconnect of the kiosk interface from the facility kiosk prior to completion of receiving the update package; and
- in response to the detecting, lock the personal inmate communication device from further user interaction.

* * * * *